United States Patent [19]

Kuwabara et al.

[11] 4,142,219

[45] Feb. 27, 1979

[54] TWO-WIRE SYSTEM INCLUDING SIGNAL RECEIVING SECTION AND DETECTION SECTION WITH PROTECTED RELAY

[75] Inventors: Katsutoshi Kuwabara, Yamato; Kanji Ishii, Machida, both of Japan

[73] Assignee: Hochiki Corporation, Tokyo, Japan

[21] Appl. No.: 769,197

[22] Filed: Feb. 16, 1977

[30] Foreign Application Priority Data

Feb. 20, 1976 [JP] Japan ............................ 51-18255[U]

[51] Int. Cl.[2] ............................................ H02H 3/08

[52] U.S. Cl. ........................................ 361/18; 323/9; 340/628; 323/9

[58] Field of Search .................. 361/18, 94, 196, 198, 361/93, 98, 100, 109, 110, 175, 176; 340/237 S; 323/9; 250/381, 382, 384, 385, 573, 574

[56] References Cited

U.S. PATENT DOCUMENTS

| | | | |
|---|---|---|---|
| 3,500,368 | 3/1970 | Abe | 340/237 S |
| 3,666,954 | 5/1972 | Sasaki et al. | 340/237 S |
| 3,717,862 | 2/1973 | Sasaki | 340/237 S |
| 3,728,706 | 4/1973 | Tipton et al. | 250/381 X |
| 3,824,434 | 7/1974 | Boley et al. | 361/198 X |
| 4,021,671 | 5/1977 | Solomon | 250/381 |

*Primary Examiner*—Patrick R. Salce
*Attorney, Agent, or Firm*—Holman & Stern

[57] ABSTRACT

Disclosed is a two-wire system including a power source, a signal receiving section and a sensing device in series which supplies electric power to and receives sensing signals from signaling devices in the system. A capacitor is connected to each sensing device for preventing a voltage drop upon initiation of its sensing action. A buffer circuit is further coupled with the receiving section for protecting against false operation by an initial current which increases upon switching on the power source, thus ensuring the system becomes stable.

2 Claims, 15 Drawing Figures

TWO-WIRE SYSTEM INCLUDING SIGNAL RECEIVING SECTION AND DETECTION SECTION WITH PROTECTED RELAY

BACKGROUND OF THE INVENTION

This invention relates to a two-wire system including a power source, a signal receiving section and a detection section in which system, the receiving section is connected to the power source and has a relay in connection with a large number of parallel detection circuits for detecting critical changes and with a circuit for protecting the relay.

In the two-wire system including the signal receiving section or circuit supplied with electrical power from the power source and connected to a great many parallel detection circuits at the ends thereof in parallel therewith a relay is employed in this receiving or receiver circuit as means for receiving the detecting operation or detection signal of the detection circuit in the receiver circuit. FIGS. 1 and 2 show examples of this two-wire system.

The two-wire system shown in FIG. 1 has a D.C. power circuit which includes a power transformer 1, four diodes $D_1$, $D_2$, $D_3$ and $D_4$ connected in bridge form to the output of the transformer 1 for rectifying an A.C. current from the transformer 1, and a smoothing condenser SC connected to the output of the bridge diodes $D_1$, $D_2$, $D_3$ and $D_4$ for smoothing the pulsating current from the bridge diodes to produce a D.C. current at first terminals *2a* and *2b;* a receiver circuit which includes a relay 3 connected between the two terminals *2a* and 2*b* of the power circuit to produce an output at second terminals 2*c* and 2*d* thereof; and a detection circuit which includes sensors $P_1$ and $P_2$ connected between third terminals 2*e* and 2*f* thereof connected respectively to the second terminals 2*c* and 2*d*. When any of the sensors $P_1$ and $P_2$ detects to close a circuit including the D.C. power circuit and the relay 3, a D.C. current will flow from the D.C. power circuit through the relay 3 and the detected sensor to energize the relay 3 to cause the contacts $S_1$ and $S_2$ of the relay 3 to be closed to illuminate a fire indicator lamp L.

The two-wire system shown in FIG. 2 employs a receiver circuit which includes a switching semiconductor or transistor Q in addition to a relay 3 for further accurately controlling the operation of the relay 3, wherein the other parts and components are the same as those shown in FIG. 1 and the description thereof is omitted. A resistor $R_2$ is connected in the receiver circuit for voltage-controlling the operation of the transistor Q in such a manner that the transistor Q is enabled and conducts when the voltage difference across the resistor $R_2$ reaches a predetermined voltage value.

As shown in FIGS. 4*a* and 4*b*, the detection circuit also includes a condenser $C_1$ having a relatively large electric capacitance for compensating the load voltage of the sensors $P_1$ and $P_2$ connected in parallel with the detection circuit, required for the ordinary and detecting operations of the senors $P_1$ and $P_2$ resulting in occurrence of the following new problems. That is, if the number of sensors is increased in parallel with the two-wire system including the receiver circuit and the detection circuit in order to raise the sensing or detecting capacity of the detection circuit, the number of the voltage compensating capacitors $C_1$ are accordingly increased. As a result, the current capacity of the power source for supplying a load current to the sensors of the detection circuit is also increased, so that the duration time of the instantaneous transient current flowing through the circuit upon activation of the power source is lengthened with the result that the relay 3 may sometimes operate to close its contacts within this transient time. Accordingly, the relay 3 must be protected from such operation during this transient time until this transient current is charged in the capacitor.

SUMMARY OF THE INVENTION

It is, therefore, an object of this invention to provide a two-wire system including a signal receiving section and a detection section which has an increased number of sensors in combination with a relay protection circuit.

It is another object of the invention to provide a two-wire system including a signal receiving section and a detection section which has a buffer or relay protection circuit for enhancing the protecting function of the relay against an increase in the transient time of the instantaneous transient current upon closure of the power source with the increase in the current capacity of the power source which is raised due to the increase in the number of the sensors employed in the detection section.

DESCRIPTION OF THE PREFERRED EMBODIMENTS

Figure 1:
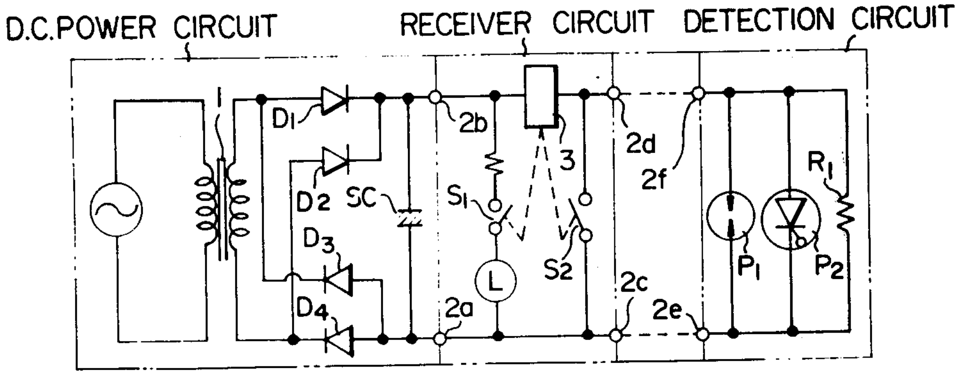
FIG. 1 PRIOR ART
FIG. 1 is a circuit diagram of the conventional two-wire system including a signal receiving section with a relay and a detection section with plural sensors connected in parallel therewith and a power source.
Figure 2:
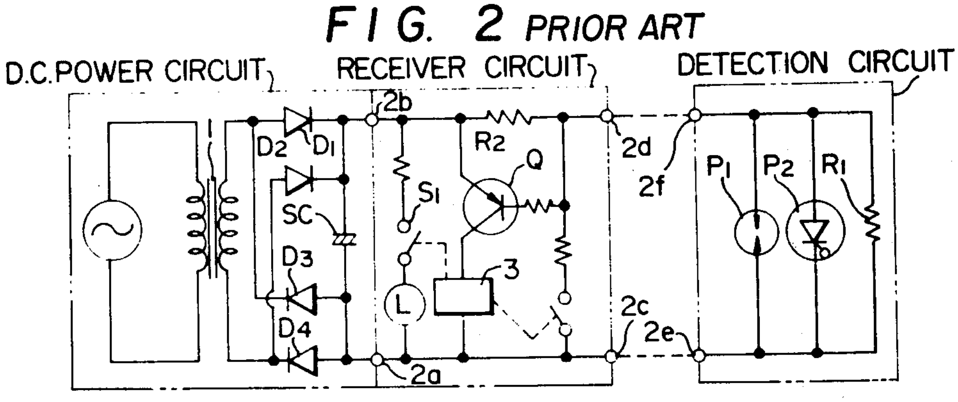
FIG. 2 PRIOR ART
FIG. 2 is a circuit diagram of the conventional two-wire system including a signal receiving section employing a relay in combination with a switching semiconductor or transistor in addition to the circuit shown in FIG. 1.
Figure 3:
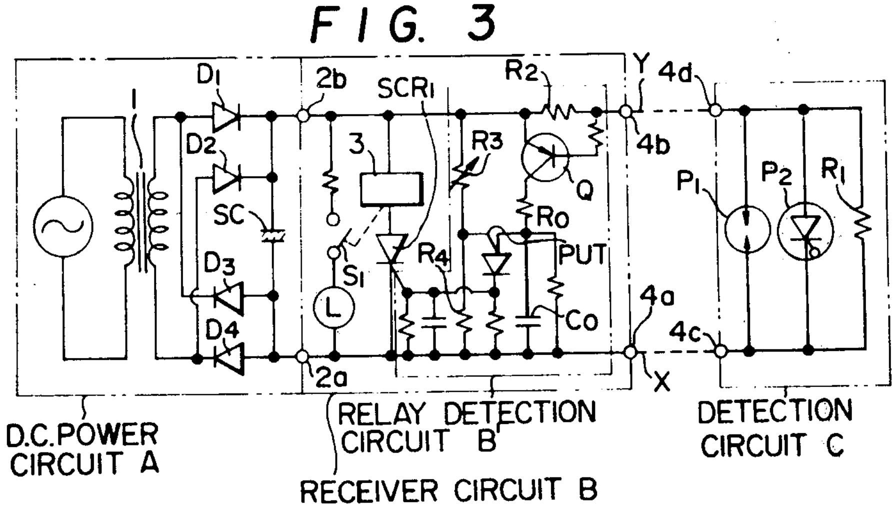
FIG. 3 is a circuit diagram of the two-wire system including a relay so protected as not to operate during the transient time upon closing of the power source constructed as one embodiment according to this invention.

Referring now to FIG. 3, for the purpose of providing two non-polarized wires X and Y, four diodes $D_1$, $D_2$, $D_3$ and $D_4$ are connected in bridge form to the secondary winding circuit of a transformer 1 in a D.C. power circuit A, as shown. This power circuit A normally produces 24 volts D.C., which is applied to the two wires X and Y. A capacitor SC connected between the two wires X and Y serves to smooth the pulsating current from the bridge diodes in the power circuit A to produce a D.C. current at first terminals 2*a* and 2*b* of the power circuit A.

The first terminals 2*a* and 2*b* are connected to a receiver circuit B, which has a lamp circuit including a lamp L, a relay circuit including a relay 3 and a thyristor $SCR_1$ for controlling the relay 3, and a buffer or relay protection circuit B', each connected between the two wire X and Y in a manner sequentially from the power circuit A side finally to second terminals 4*a* and 4*b*. One of the relay contacts $S_1$ of the relay 3 is connected in the lamp circuit and the other relay contacts thereof are connected, for example, in other peripheral devices such as an alarm equipment, control circuit of fire prevention device, etc.

The buffer or relay protection circuit B' has a resistor $R_2$ connected in series between the wire Y and power terminal 26. A switching semiconductor or transistor Q has an emitter and a base connected across the resistor $R_2$. A time constant circuit including a resistor Ro and a capacitor Co, connected in series with each other is connected between the collector of the transistor Q and the wire X. A Programmable Unijunction Transistor (PUT) has an anode connected to the junction of the resistor Ro and the capacitor Co of the time constant circuit and a gate connected to the junction of resistors $R_3$ and $R_4$ which form a voltage divider between the two wires X and Y. The PUT has an output terminal connected to the gate of the thyristor $SCR_1$. Thus, the operational condition of the PUT can be changed by varying the value of any of the resistor Ro, $R_3$, $R_4$ or capacitor Co. A desirable relay protecting function can be defined by changing the operational condition of the PUT.

Third terminals 4*c* and 4*d* of a detection circuit C are connected to the second terminals 4*a* and 4*b*, respectively, of the receiver circuit B. A sensor $P_1$ connected in parallel to the terminals 4*c* and 4*d* of the detection circuit C is a photoelectric detector, as shown in detail in FIG. 4*b*. A sensor $P_2$ connected in parallel to the terminals 4*c* and 4*d* of the detection circuit C is an ionization smoke detector, as shown in detail in FIG. 4*a*. Referring back to FIG. 3, a resistor $R_1$ connected in parallel to the terminals 4*c* and 4*d* and the sensors $P_1$ and $P_2$ of the detection circuit C is a terminal resistor used for checking the breakage of the detection circuit C. To the respective sensors $P_1$ and $P_2$ is applied a voltage divided by the resistors $R_1$ and $R_2$ from the D.C. voltage supplied from the power circuit A.

Figure 4A:
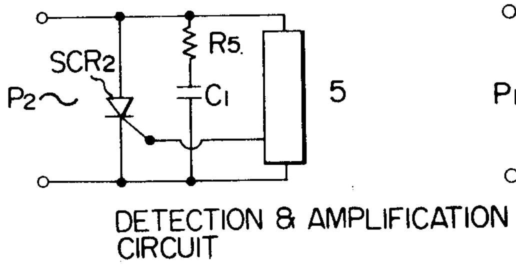
FIG. 4a PRIOR ART
FIG. 4*a* is a partial circuit diagram of an ionization smoke detector employed in the detection circuit of this invention.

The sensor $P_2$ shown in FIG. 4*a* employs a voltage compensating capacitor $C_1$ connected in parallel therewith in order to prevent an inadvertent decrease in the voltage applied to an ionization chamber used for a detection and amplification circuit 5, and a thyristor $SCR_2$ connected in parallel therewith and triggered upon receipt of the output from the circuit 5. When the thyristor $SCR_2$ conducts, a high load is separated therefrom. As a result, D.C. current supplied from the power circuit A to the two wires X and Y is increased, and accordingly the voltage difference across the resistor $R_2$ reaches a predetermined value resulting in conducting of the transistor Q.

Figure 4B:
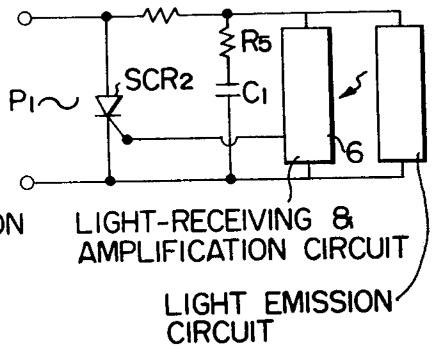
FIG. 4b PRIOR ART
FIG. 4*b* is a partial circuit diagram of a photoelectric detector adopted in the detection circuit of this invention.

The photoelectric sensor $P_1$ shown in FIG. 4*b* also adopts a capacitor $C_1$ for compensating the increased current consumption in a light-receiving and amplification circuit 6 upon conduction of the cicuit 6, and a thyristor $SCR^2$ connected in parallel therewith and triggered upon receipt of the output from the circuit 6. To the respective capacitors $C_1$ are connected resistors $R_5$ in series with the capacitors $C_1$ for controlling the charging current of the capacitors $C_1$.

Figure 5C:
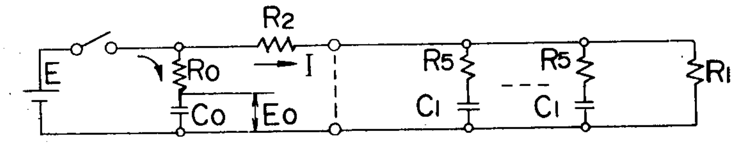
FIG. 5*c* is an equivalent circuit for introducing a correlation between the transient current shown in FIGS. 5*a* and 5*b* and the relay protecting function.
Figures 5A, 5B:
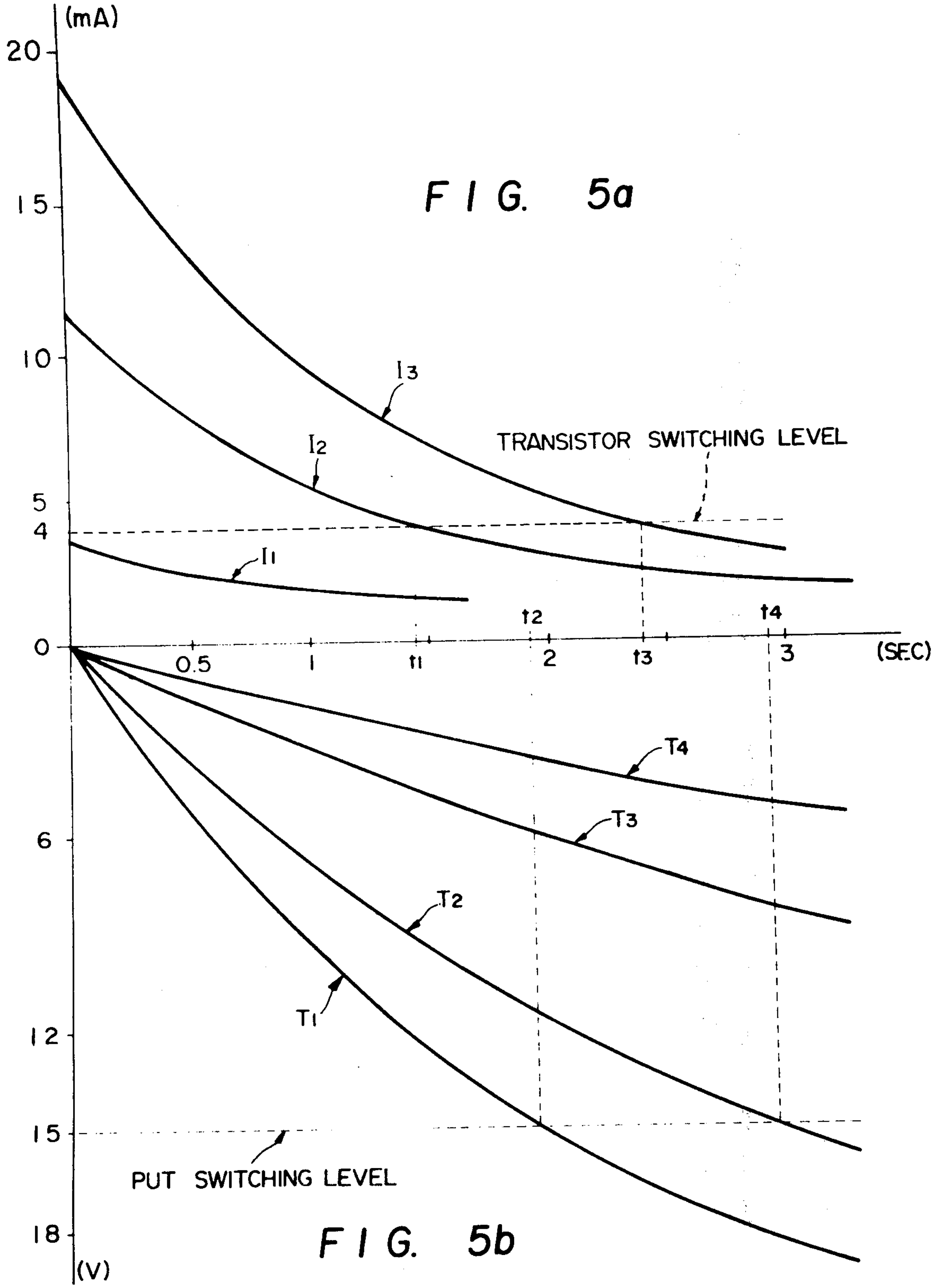
FIG. 5*a* is a graph showing a transient current flowing through the two-wire system varying in case the number of sensors used in the detection circuit is increased wherein an electric current is shown along the y-axis in mA and time in seconds along the x-axis.
FIG. 5*b* is a graph showing a correlation curve of the protecting function required for the relay protection circuit against the transient current shown in FIG. 5*a* wherein a voltage is shown along the y-axis in volts and time in seconds along the x-axis.

FIG. 5*a* shows the variations of the transient current I measured across the resistor $R_2$ upon application of the current from the power circuit A caused by the increase in the electric capacitance (the sum of the respective capacitors $C_1$) increased when a large number of sensors $P_1$, $P_2$, . . . are connected in parallel to the detection circuit C. An electric current $I_1$ flowing in the detection circuit C upon application of the current from the power circuit A when one sensor is connected in the detection circuit C does not energize the relay 3 because it does not exceed the switching level 4mA of the transistor. However, the transient current $I_2$ flowing in the detection circuit C when five sensors are connected in the detection circuit C becomes 12 mA upon application of the current from the power circuit A and it takes $t_1 = 1.5$ second until the current 12 mA is decreased below 4 mA. The transistor Q will continue conducting during this transient time. Furthermore, the transient current $I_3$ flowing in the detection circuit C when ten sensors are connected in the detection circuit C becomes 18 mA upon application of the current from the power circuit A and it takes $t_3 = 2.5$ seconds longer than before until the current 18 mA is decreased below 4 mA. The relay protecting function required for the relay protecting circuit B' against such transient time of this case is set as follows shown in FIG. 5*b*.

If the switching level, i.e., the anode potential of the PUT is set to 15 volts while the voltage supplied from the power circuit is normally 24 volts and the time constant of the time constant circuit Ro and Co connected to the output circuit of the transistor Q is set to RoCo = 2 as designated by $T_1$, the time of the transient current increasing to 15 volts becomes $t_2 = 2$ seconds, so that the transient current $I_2$ flowing in the detection circuit C when five sensors are connected in the detection circuit C shown in FIG. 5*a* does not energize the relay 3 so as to protect the relay 3. If the time constant of the time constant circuit Ro and Co is set to RoCo = 3 as designated by $T_2$, the time of the increasing transient current to the anode potential of the PUT is extended to $t_4 = 3$ seconds, with the result that the transient current $I_3$ flowing in the detection circuit C when ten sensors are connected in the detection circuit C shown in FIG. 5*a* does not energize the relay 3 so as to protect the relay. The curve $T_3$ shows the increasing state of the anode potential of the PUT in case the time constant of the time constant circuit RoCo is set to RoCo = 7, and the curve $T_4$ shows the same state but in case the time constant is set to RoCo = 12. Thus, the preferable conditions adapted to protect the relay 3 from the transient current flowing in the detection circuit C so as not to energize the relay 3 upon application of the current from the power circuit to the sensor sircuit of the detection circuit C are easily determined by the setting of the time constant of the time constant circuit Ro and Co and the anode potential of PUT in combination. It is to be noted that if the larger time constant of the time constant circuit Ro and Co is set and the anode potential of the PUT is lowered, the relay protecting function can be strengthened for the relay 3 as required. It should also be noted that the required relay protecting condition can be determined by changing the voltage divided by the resistors $R_3$ and $R_4$ of the control circuit for determining the gate potential of the PUT.

FIG. 5*c* shows an equivalent circuit of the two-wire system employed for obtaining the values shown in FIGS. 5*a* and 5*b*. Reference character Eo represents an anode potential of PUT. From this equivalent circuit is calculated a correlation between the transient current I across the resistor $R_2$ and the timing variations of the anode potential Eo of the PUT upon application of the current from the power circuit to the detection circuit C. The numbers of the capacitors $C_1$ and resistors $R_5$ are equal to that of the sensors connected in the detection circuit C.

Data employed for this equivalent circuit are as follows:

$$E = 24 \text{ volts}, R_1\ 20\ k\Omega, R_2 = 300\Omega, R_5 = 10\ K\Omega,$$

$$C_1 = 100\ \mu F,$$

and Roco as previously listed.

The transient current I can be generally represented by the following equation:

$$I = \frac{E}{R_1 + R_2}\left\{1 + \frac{R_1^2}{R_1R_2 + R_2R_5 + R_5R_1}\epsilon - \frac{R_1 + R_2}{C_1(R_1R_2 + R_2R_5 + R_5R_1)} t'\right)$$

The anode potential Eo of the PUT is represented by the following equation:

$$Eo = E(1 - \epsilon - \frac{1}{RoCo} t)$$

where $\epsilon$ signifies an exponential, and t signifies time.

From the above two equations, the following times t' and t can be obtained as follows:

$$t' = \frac{C_1(R_1R_2 + R_2R_5 + R_5R_1)}{R_1 + R_2} \log \frac{I - \frac{E}{R_1 + R_2}}{\frac{ER_1^2}{(R_1 + R_2)(R_1R_2 + R_2R_5 + R_5R_1)}}$$

and $$t = -RoCo \log (1 - \frac{Eo}{E})$$

From the above two equations, if the time constant RoCo is determined in the relationship of $t' < t$, the respective values for protecting the relay 3 can be determined.

Figure 6C:
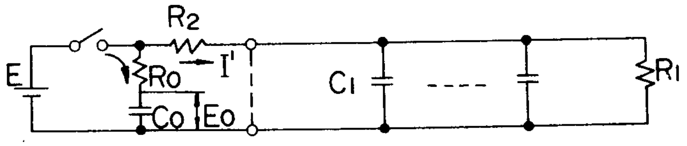
FIG. 6*c* is an equivalent circuit for introducing a correlation between the transient current shown in FIGS. 6*a* and 6*b* and the relay protecting function.
Figures 6A, 6B:
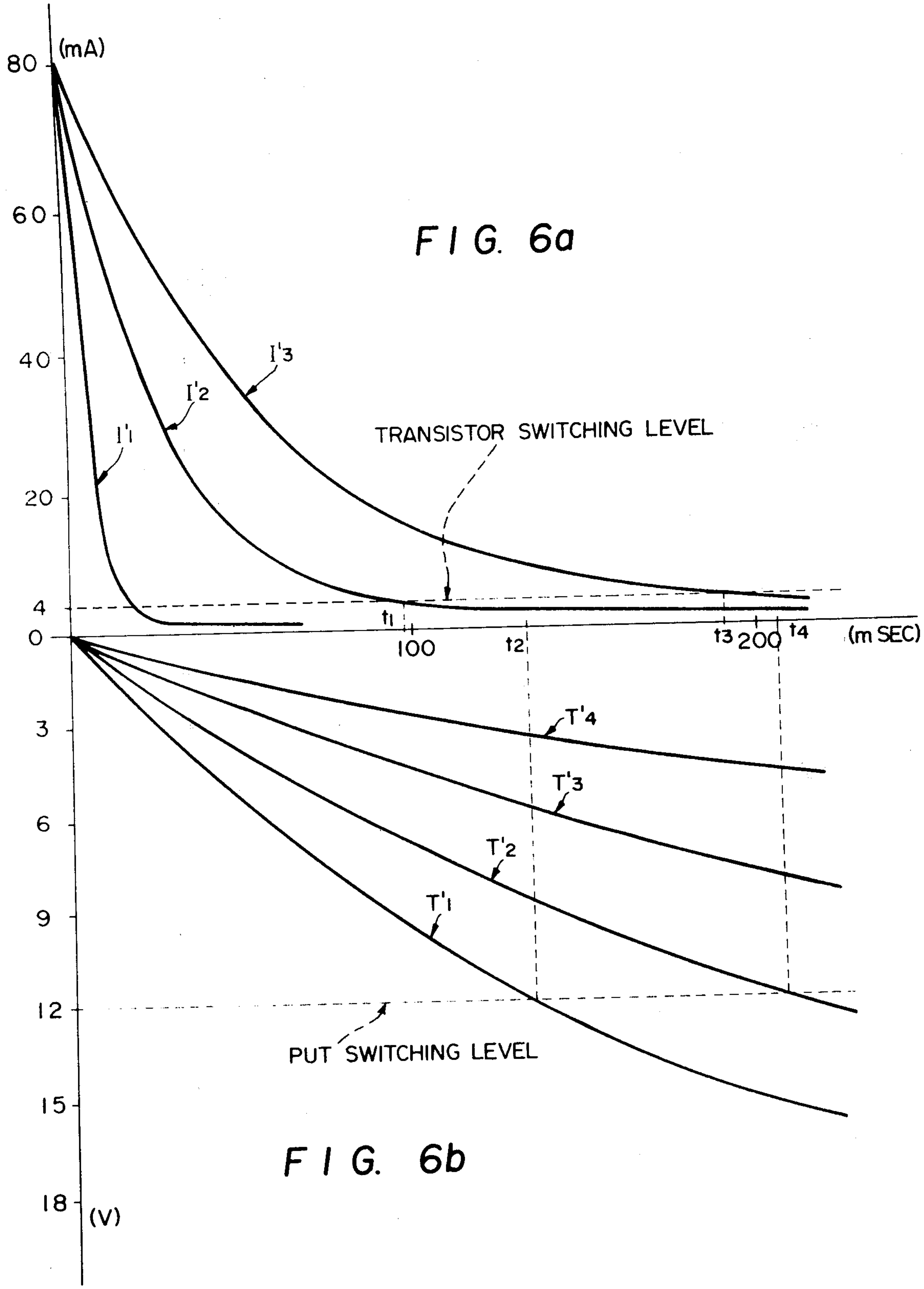
FIGS. 6*a* and 6*b* are graphs showing another examples of the correlation between the transient current and the relay protecting function in corresponding manner.

The various transient currents $I_1'$, $T_2'$ and $I_3'$ shown in FIG. 6*a* and various anode potentials $T_1'$, $T_2'$, $T_3'$ and $T_4'$ of the PUT shown in FIG. 6*b* are the values of the two wire-system including a signal receiver circuit and detection circuit having an equivalent circuit shown in FIG. 6*c*. That is, this two-wire system does not have a resistor $R_5$ for controlling the charging current of the voltage compensating capacitor $C_1$ shown in FIG. 5*c* in connection to the capacitor $C_1$ used in the respective sensors of the detection circuit C, wherein the parts and components except the resistor $R_5$ are the same as those shown in FIG. 5*c* and the description thereof is omitted. The transient current $I_1'$ represents current in case only one capacitor $C_1$ is connected in the sensor circuit of the detection circuit C in FIG. 6*c*. The transient current $I_2'$ represent a current in case five capacitors $C_1$ are employed, and $I_3'$ in case 10 capacitors $C_1$ are used. In FIG. 6*b*, the anode potential $T_1'$ of the PUT is in case the time constant of the time constant circuit is set to RoCo = 0.2 second, $T_2'$ is in case RoCo = 0.3, $T_3'$ is in case RoCo = 0.5, and $T_4'$ is in case RoCo = 0.9, wherein the Y-axis of the graph in FIG. 6*a* shows the values in mA, and the X-axis the time in msec., and the Y-axis of the graph shown in FIG. 6*b* shows the value upside down in volts. These graphs suggest the fact that if the electric capacitance of the voltage compensating capacitors $C_1$ is increased with an increase in the number of the sensors in the detection circuit C, the transient time of the transient current I' decreasing to the switching level 4 mA of the transistor Q is lengthened. Accordingly, it is necessary to select a preferable time adapted to charge the anode potential of the PUT so as to protect the relay 3 from the transient current I'. The general equation of the relationship between the anode potential Eo of PUT and the transient current I' can be represented by the following equations:

$$I' = \frac{E}{R_1 + R_2}(1 + \frac{R_2}{R_1}, \epsilon - \frac{R_1 + R_2}{R_1R_2C_1} t'')$$

$$Eo = E(1 - \epsilon - \frac{1}{RoCo} t)$$

From these two equations, the following times t'' and t can be obtained as follows:

$$t'' = \frac{R_1R_2C_1}{R_1 + R_2} \log \left(\frac{I - \frac{E}{R_1 + R_2}}{\frac{ER_2}{(R_1 + R_2)R_1}}\right)$$

$$t = -RoCo \log (1 - \frac{Eo}{E})$$

From the above two equations, if the time constant RoCo is determined in the relationship of $t'' < t$, the respective values for protecting the relay 3 can be determined.

What is claimed is:

1. A two-wire system including a power source for supplying electric power, a signal receiving section for receiving a sensing signal and a sensing section for providing a sensing signal in the two wires, comprising:

a D.C. power source, a receiving section provided with a pair of power terminals and also another pair of sensor terminals for the two wires, said receiving section further comprising:

means connecting said power terminals to said power source, a relay circuit having a relay and a thyristor in series connected between said power terminals, said thyristor having a gate, a resistor connecting one of said pair of power terminals to one of said sensor terminals, a switching-transistor having an emitter-bare circuit connected in parallel with said resistor and operative in response to a voltage difference across said resistor, a buffer circuit provided between the gate of said thyristor and the collector of said switching transistor, and a plurality of sensing sections connected in parallel to said pair of sensor terminals, each sensing section including:

a sensing device connected across said sensor terminals for providing an output upon sensing a predetermined condition;

a switching circuit connected between said sensor terminals, parallel to the sensing device, and operative upon receiving an output from the sensing device, and a capacitor connected in parallel with each sensing device for preventing a voltage drop upon activation of said power source, whereby after the power source is activated the collector of said switching-transistor is prevented from activating the gate of said thyristor by said buffer circuit during a transition time in which said capacitors are being charged.

2. A two-wire system as defined in claim 1, wherein said buffer circuit comprises an R-C time constant circuit connected between the collector of said switching-transistor and the other of said sensor terminals, and a programmable unijunction transistor having:

an anode connected to a junction between resistor R and capacitor C of said R-C time constant circuit;

a gate connected to a voltage divider, said divider connected across said pair of power terminals; and a collector connected to the gate of the thyristor of said relay circuit.

* * * * *